(12) United States Patent
Jaynes et al.

(10) Patent No.: US 12,513,133 B2
(45) Date of Patent: Dec. 30, 2025

(54) SYSTEMS AND METHODS FOR USING ENTERPRISE IDP FUNCTIONALITY TO AUTHORIZE USER ACCESS ACROSS SERVERS

(71) Applicant: TARGET BRANDS, INC., Minneapolis, MN (US)

(72) Inventors: Jeffrey Jaynes, Minneapolis, MN (US); Thomas Sheffield, II, Minneapolis, MN (US); Carolina Clement, Minneapolis, MN (US); Shanmukha Reddy Pamuru, Minneapolis, MN (US); Andrew Guck, Minneapolis, MN (US); Gokul Baskaran, Minneapolis, MN (US); Shane Petrich, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 274 days.

(21) Appl. No.: 18/303,847

(22) Filed: Apr. 20, 2023

(65) Prior Publication Data

US 2024/0007454 A1 Jan. 4, 2024

Related U.S. Application Data

(60) Provisional application No. 63/357,957, filed on Jul. 1, 2022.

(51) Int. Cl.
H04L 9/40 (2022.01)
(52) U.S. Cl.
CPC .............................. *H04L 63/0823* (2013.01)

(58) Field of Classification Search
None
See application file for complete search history.

(56) References Cited

U.S. PATENT DOCUMENTS

| 8,769,701 B2 | 7/2014 | Hinton et al. |
| 9,560,036 B2 | 1/2017 | Hinton et al. |

(Continued)

OTHER PUBLICATIONS

Alaca (Alaca et al., 'Comparative Analysis and Framework Evaluating Web Single Sign-On Systems') (Apr. 30, 2018) (Year: 2018).*

(Continued)

*Primary Examiner* — Tod R Swann
*Assistant Examiner* — Amir Mahdi Hajiabbasi
(74) *Attorney, Agent, or Firm* — Barnes & Thornburg LLP

(57) ABSTRACT

The disclosed technology provides for authenticating server access using enterprise credentials. A method can include authenticating, by a client computing device operating within an enterprise environment, a user with an enterprise identity provider ("IdP") system that authenticates based on user enterprise credentials, receiving, in response to the user being authenticated, a bearer token from the system, transmitting the bearer token to a certificate service for use in obtaining a secure shell ("SSH") certificate signed by an SSH certificate authority ("CA") within the enterprise, receiving, at the client computing device, the signed SSH certificate, updating an SSH agent on the client computing device to use the SSH certificate with the enterprise identifier for the user, and remotely accessing any of a group of servers within the enterprise using the SSH certificate and enterprise identifier, where each server authenticates the remote access based on the SSH certificate signed by the SSH CA.

20 Claims, 9 Drawing Sheets

(56) References Cited

U.S. PATENT DOCUMENTS

| | | |
|---|---|---|
| 9,923,888 B2 | 3/2018 | Goel et al. |
| 10,873,572 B1 | 12/2020 | Krishna |
| 11,444,925 B1* | 9/2022 | Patimer ................. H04L 67/147 |
| 2004/0022258 A1* | 2/2004 | Tsukada ................ H04L 63/102 370/401 |
| 2014/0283105 A1* | 9/2014 | Trevor .................... G06F 21/10 726/27 |
| 2015/0172318 A1* | 6/2015 | Elley ....................... H04L 63/20 726/1 |
| 2015/0304847 A1* | 10/2015 | Gong ................. H04L 63/0823 455/411 |
| 2017/0161503 A1* | 6/2017 | Seigel ................ H04L 63/1425 |
| 2017/0177861 A1* | 6/2017 | Sunada ................... G06F 21/54 |
| 2018/0077144 A1* | 3/2018 | Gangawane .......... H04L 63/102 |
| 2018/0176240 A1* | 6/2018 | Kopp ..................... H04L 9/3263 |
| 2018/0375886 A1* | 12/2018 | Kirti ....................... H04L 67/10 |
| 2019/0044940 A1* | 2/2019 | Khalil .................... H04L 9/3247 |
| 2019/0058714 A1* | 2/2019 | Joshi .................... H04L 63/0823 |
| 2019/0080088 A1* | 3/2019 | Tock ....................... G06F 21/56 |
| 2020/0250664 A1* | 8/2020 | Kumar ................ H04L 63/0838 |
| 2021/0185032 A1* | 6/2021 | Walsh ................... H04L 63/168 |
| 2022/0182374 A1* | 6/2022 | Peddada ............. H04L 63/0807 |
| 2022/0329584 A1* | 10/2022 | Sharma ................. H04L 9/3263 |
| 2022/0368528 A1* | 11/2022 | Vennapusa ............ H04L 9/3073 |
| 2023/0101920 A1* | 3/2023 | Xiao ................... H04L 63/0281 713/168 |
| 2023/0141966 A1* | 5/2023 | Weeden ................ G06F 21/629 713/185 |

OTHER PUBLICATIONS

Smallstep Technical Documentation.
Teleport Technical Documentation.
Okta Technical Documentation.

\* cited by examiner

FIG. 4B

SYSTEMS AND METHODS FOR USING ENTERPRISE IDP FUNCTIONALITY TO AUTHORIZE USER ACCESS ACROSS SERVERS

INCORPORATION BY REFERENCE

This application claims priority to U.S. Provisional Application Ser. No. 63/357,957, filed on Jul. 1, 2022, the disclosure of which is incorporated by reference in its entirety.

TECHNICAL FIELD

This document describes devices, systems, and methods related to leveraging Secure Shell (SSH) access and Identity Provider (IdP) functionality of an enterprise to provide users associated with the enterprise streamlined and secure access to various servers and systems in the enterprise's network.

BACKGROUND

An enterprise data infrastructure can include any number of servers. Some data infrastructures or other enterprise networks can have one server. Some data infrastructures or other enterprise networks can have many servers. Each server can require credentials, such as account login information, for a user to access services provided by that server. Each server can require different login information or other types of credentials. A user, for example, can maintain multiple different credentials where each credential is used to access a different server in the enterprise data infrastructure. Similarly, the enterprise data infrastructure can maintain mappings of user credentials to servers within the infrastructure. The mappings can be updated as user credentials are updated and/or users leave, enter, and/or gain/loose access rights to the servers of the infrastructure. Whenever a user logs into or otherwise accesses a particular server in the enterprise data infrastructure, for example, the user can provide the credentials corresponding to that server and the user's credentials can be checked against the mappings to determine whether the user is authorized to access that server. The user can then gain access to that server in the enterprise data infrastructure.

SUMMARY

The document generally describes to middleware technology for managing access to Secure Shell (SSH) in a way that ties user access to an enterprise's IdP functionality. An enterprise's data infrastructure can have any quantity of servers. Some data infrastructures can, for example, be scalable. With an increased quantity of servers or increased scalability, the infrastructure can become more complex and governance and/or auditing of server credentials can become more challenging. The disclosed technology therefore leverages SSH access to an enterprise's existing IdP to allow for Single Sign On (SSO) functionality in the enterprise's infrastructure to extend to SSH access. With the disclosed technology, instead of every server using various credentials, such as non-specific account names like "local_user", a user with a unique SSO identity can access SSH servers using that unique identity. The unique SSO identity can be, as an illustrative example, "Jane.Doe." The enterprises's IdP functionality may identify the user by "Jane.Doe@domain.com," which can then be used to extend SSH access for the user across the servers of the enterprise's data infrastructure.

The disclosed technology can use a command-line program in a terminal of a client device (e.g., user device) to request an SSH certificate for a user at the client device. If the user is not already logged in to the enterprise's IdP, the terminal can launch a web browser at the client device with instructions to load the IdP log-in page. The user can then log in, at the web browser, with their credentials (e.g., password, biometrics, email account, username) using the same log in process as any other, typical, or expected SSO experience. Once the user is logged in, the disclosed technology can request an SSH certificate from a certificate authority service. If the user is authorized, based on their inputted credentials, the certificate authority service can create an SSH certificate for the user that specifies the user's permission to access an SSH server. The SSH certificate can also specify a short Time to Live (TTL) for the user's access. The user can then use a default SSH client in the terminal at the client device to log into the SSH server, and thus can log in to the server using their IdP identity. Both the user viewing the terminal and audits of the SSH server may show the user logged in as "Jane.Doe@domain.com@example" for a server with an internal network address of "example." As a result, the user can access one or more SSH servers in the enterprise's data infrastructure. The log in activity of the user across the SSH servers can also be identified by "Jane.Doe@domain.com@example" to provide visibility into what actions are being performed by what users in the enterprise's data infrastructure.

One or more embodiments described herein can include a method for authenticating server access using enterprise credentials, the method can include: authenticating, by a client computing device operating within an enterprise environment, a user with an enterprise identity provider ("IdP") system that can be configured to authenticate based on user enterprise credentials transmitted by the client computing device to the enterprise IdP system, the user enterprise credentials including at least an enterprise identifier for the user, receiving, at the client computing device and in response to the user being authenticated, a bearer token from the enterprise IdP system, the bearer token authenticating the enterprise credentials for the user within the enterprise environment, transmitting, by the client computing device, the bearer token to a certificate service, the certificate service being configured to use the bearer token to obtain a secure shell ("SSH") certificate signed by an SSH certificate authority ("CA") within the enterprise environment, receiving, at the client computing device, the SSH certificate signed by the SSH CA based on the bearer token, updating, by the client computing device, an SSH agent on the client computing device to use the SSH certificate with the enterprise identifier for the user, and remotely accessing, by the client computing device, any of a group of servers within the enterprise environment using the SSH certificate and enterprise identifier for the user, each of the group of servers being configured to authenticate the remote access by the client computing device based, at least in part, on the SSH certificate signed by the SSH CA.

In some implementations, the embodiments described herein can optionally include one or more of the following features. For example, each of the group of servers can be configured to use one or more system security services daemons ("SSSD") services to authorize a principal in the SSH certificate, the principal being a string that permits access to each of the group of servers. The one or more SSSD services can be configured to authorize the principal in the SSH certificate based, at least in part, on Active Directory ("AD") group membership of the enterprise identifier. The AD group membership of the enterprise identifier can indicate whether and to what extent the corresponding user may be entitled to access the group of servers within the enterprise environment.

As another example, the certificate service can be configured to generate and store a public-private key pair based on the bearer token for the user, to provide the public key to the SSH CA for signing, and to provide the signed public key to the client computing device as the SSH certificate. The certificate service can further be configured to designate a time-to-live ("TTL") for the SSH certificate, the TTL including a time period during which the SSH certificate may be valid to authenticate the remote access to the group of servers by the user. Attempts to remotely access the group of servers using the SSH certificate after expiration of the TTL time period can be declined. The TTL time period can include a short time period less than or equal to a threshold period of time. The threshold period of time can be 15 minutes.

In some implementations, the remote access by the client computing device can uniquely identify the user on the group of servers with the enterprise identifier. The group of servers can be configured to log the remote access by the user using the enterprise identifier for the user. The remote access by the client computing device can be accomplished without local authentication of the user by the group of servers. The remote access by the client computing device can also be accomplished without locally authenticating credentials for the user by the group of servers. The enterprise identifier can include a personal LanID for the user within the enterprise environment.

One or more embodiments described herein can include a system for authenticating server access using enterprise credentials, the system including: an enterprise environment having a group of servers, a client computing device operating within the enterprise environment, and an enterprise identity provider ("IdP") system that can be configured to authenticate users based on user enterprise credentials transmitted by the client computing device to the enterprise IdP system, the user enterprise credentials including at least an enterprise identifier for the user. The client computing device can be configured to: authenticate a user with the enterprise IdP system, receive, in response to the user being authenticated, a bearer token from the enterprise IdP system, the bearer token authenticating the enterprise credentials for the user within the enterprise environment, transmit the bearer token to a certificate service, the certificate service being configured to use the bearer token to obtain a secure shell ("SSH") certificate signed by an SSH certificate authority ("CA") within the enterprise environment, receive the SSH certificate signed by the SSH CA based on the bearer token, update an SSH agent on the client computing device to use the SSH certificate with the enterprise identifier for the user, and remotely access any of the group of servers within the enterprise environment using the SSH certificate and enterprise identifier for the user, each of the group of servers being configured to authenticate the remote access by the client computing device based, at least in part, on the SSH certificate signed by the SSH CA.

The system can optionally include one or more of the abovementioned features. The system can also optionally include one or more of the following features. For example, each of the group of servers can be configured to use one or more system security services daemons ("SSSD") services to authorize a principal in the SSH certificate, the principal being a string that permits access to each of the plurality of servers. The certificate service can be configured to generate and store a public-private key pair based on the bearer token for the user, to provide the public key to the SSH CA for signing, and to provide the signed public key to the client computing device as the SSH certificate. The certificate service can also be configured to designate a time-to-live ("TTL") for the SSH certificate, the TTL including a time period during which the SSH certificate may be valid to authenticate the remote access to the group of servers by the user. The remote access by client computing device can uniquely identify the user on the group of servers with the enterprise identifier, the group of servers being configured to log the remote access by the user using the enterprise identifier for the user. The remote access by the client computing device can be accomplished without local authentication of the user by the group of servers.

The devices, system, and techniques described herein may provide one or more of the following advantages. For example, the disclosed technology combines security logging with existing authorization patterns in an enterprise data infrastructure in order to address a security concern of non-repudiation (e.g., inability to deny action). Non-repudiation can be addressed with the disclosed technology by issuing SSH certificates to a user's local area network identifier (LanId), or other credential(s), and logging the user's access and activities on and across SSH servers of the enterprise's data infrastructure. Logging the activities of the user across the data infrastructure can also be beneficial to identify or otherwise detect suspicious behavior, unauthorized behavior, or other behavior that may be atypical for the particular user or for users of the infrastructure. Logging the activities using the disclosed technology can provide an added security measure to help the enterprise identify, address, and prevent potential security risks within the enterprise's data infrastructure.

As another example, the disclosed technology combines security logging with existing authorization patterns in the enterprise data infrastructure in order to address a security concern in key management. Typically, key management requires safeguarding a private key in a secure place and rotating a private-public key pair on a regular interval. The disclosed technology, therefore, incorporates governance techniques such that SSH certificates may expire within a threshold amount of time (such as 15 minutes) and cause a new certificate to be issued for the user's next log in. As a result, a need for key management can be eliminated in the enterprise's data infrastructure.

Moreover, the disclosed technology combines security logging with existing authorization patterns in the enterprise data infrastructure in order to address a security concern of personal privileged access for users in the infrastructure. Typically, personal privileged access represents user's accessing privileged servers in the enterprise data infrastructure using their personal LanIDs and performing privileged actions once granted access to the privileged server(s). Sometimes, the user's personal account(s) can be compromised. When the personal account(s) are compromised, the enterprise data infrastructure can be exposed to security threats and attacks. The disclosed technology, therefore requires two factor authentication when using personal LanIDs, thereby reducing security risks that come with allowing personal privileged access to privileged servers in the enterprise data infrastructure.

The disclosed technology is lightweight, lean, and modular. The disclosed technology can be easily and efficiently deployed in different types of networks, data infrastructures, and other ecosystems to provide secure and trusted access to users of a data infrastructure. Because the disclosed technology is lean, processes for granting access and authorizing users to various different components in the data infrastructure can be streamlined. One process, for example, can be performed that authenticates the user's access across all components (or a subset of the components) in the network infrastructure, instead of requiring each component to perform separate or unique processes, which can be tedious, time consuming, and cause complexity in mapping user login credentials across components. Moreover, the disclosed technology is lightweight and lean because it is focused on authenticating a user as the person they say they are. The disclosed technology can act like a digital fingerprint that, once authenticated, makes the user known and trustworthy to the data infrastructure and thus granted access to various components of the infrastructure without requiring additional access and/or authentication processes at each of the components to be performed.

Additionally, the disclosed technology is lightweight and lean because it does not require governance or keeping track of and maintaining hundreds, thousands, or more local or enterprise accounts and/or login credentials associated with users in the network infrastructure in order to authenticate and authorize any of those users to access components (e.g., services, servers) of the infrastructure. The disclosed technology does not require complex account and mapping of various different login credentials across servers, services, systems, or other components of the infrastructure. As a result of leveraging key-based SSH authentication with enterprise IdP identities, users can be more quickly and accurately authenticated and granted access across the components of the infrastructure.

Since the disclosed technology does not maintain enterprise or local accounts or other login credentials for users of a data infrastructure, the disclosed technology can increase security and maintain user privacy within the infrastructure. After all, the disclosed technology may not maintain user information which could be leaked and/or stolen in instances of security threats.

The details of one or more implementations are set forth in the accompanying drawings and the description below. Other features and advantages will be apparent from the description and drawings, and from the claims.

BRIEF DESCRIPTION OF THE DRAWINGS

FIG. 4B is an example output from running the executable in FIG. 4A indicating that a user has logged into a server of an enterprise data infrastructure using their respective enterprise IdP identity.

Like reference symbols in the various drawings indicate like elements.

DETAILED DESCRIPTION OF ILLUSTRATIVE EMBODIMENTS

This document generally relates to leveraging enterprise IdP functionality with key-based SSH authentication to authenticate users of the enterprise's data infrastructure. As a result, a user can log into a component, such as an SSH server, of the data infrastructure using their enterprise IdP identity (e.g., LanID). That IdP identity can be certified using SSH authentication techniques. Once certified, the user may be authorized access to the SSH server and other components of the data infrastructure, such as other SSH servers, without having to provide other login credentials and undergo other authorization processes at the components.

Authorization of the user can be managed via System Security Services Daemon (SSSD) and based on the user's active directory (AD) group membership (e.g., a user can be associated with one or more groups, and each group can give the users access to certain resources). SSSD provides access to remote identity and authentication providers. For example, authentication providers can be configured as back-ends with SSSD acting as an intermediary between local clients, such as a user's client device, and one or more configured back-end provider. The local clients can connect to SSSD and then SSSD can contact the authentication providers to begin the authentication process. By using SSSD, the local clients do not have to directly contact the authentication providers, which can reduce load. Moreover, in some implementations, SSSD can be used to allow users at the local clients to authenticate when they are offline by optionally caching user identities, credentials, or other IdP identities. Additionally, since SSSD can maintain network credentials, users can connect to network resources by authenticating with their local username on their local client device, instead of requiring various login credentials for each of the network resources.

Figure 1:
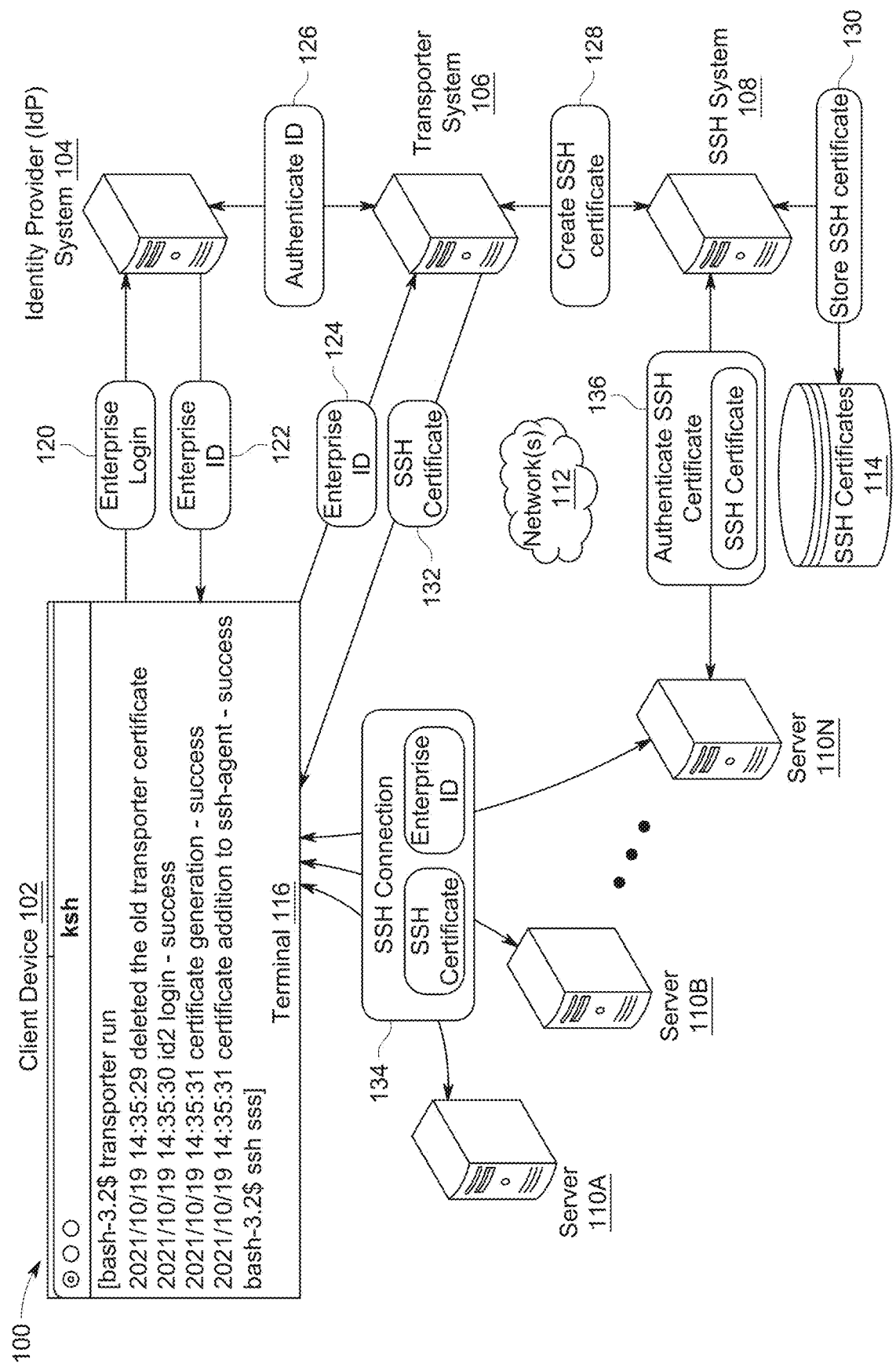
FIG. 1 is a conceptual diagram that illustrates using enterprise IdP functionality to grant a user access to servers in an enterprise data infrastructure.

Referring to the figures, FIG. 1 is a conceptual diagram that illustrates using enterprise IdP functionality to grant a user access to servers in an enterprise data infrastructure 100. A client device 102, identity provider (IdP) system 104, transporter system 106, SSH system 108, SSH certificates data store 114, and servers 110A-N can communicate (e.g., wired and/or wireless) via network(s) 112 in the enterprise data infrastructure 100. The client device 102 can present or output a terminal application 116 that can be used to register or acknowledge enterprise login information, such as the user's enterprise IdP identity, for the user of the client device 102. If the client device 102 does not already have SSO credentials for the user, then the terminal application 116 may redirect the user interface presented at the client device 102 to a web browser of the IdP system 104 so that the user can input their enterprise login information. Then, the terminal application 116 can be presented against the client device 102 so that the user can log into one or more of the servers 110A-N (e.g., SSH servers or other types of servers, services, and/or components) in the enterprise data infrastructure 100 with an SSH certificate from the SSH system 108 (e.g., a certificate authority service, an authorization provider). As described herein, the SSH system 108 can leverage the user's enterprise's IdP identity to determine authorization for that user, then mint an SSH certificate that specifies the IdP identity and a short TTL. The user can then access one or more of the servers 110A-N within the enterprise data infrastructure 100 using the same SSH certificate and SSO credentials during the TTL. Once the TTL expires, a new SSH certificate can be generated.

Traditionally, SSH systems can be used to log a user into a server, but the user would need an account on that server to undergo an authentication process. As a result, it can be a time-consuming and challenging process to identify accounts across all servers in a data infrastructure to verify the user that is trying to log into the particular server. Moreover, if various user accounts share an admin group, it can be challenging to determine which user in the admin group is actually logging into the server since all the users in the group use the same admin group login. Therefore, it can be challenging to track user activity at the server, identify malicious activity at the server, an associate the malicious activity with a particular user in the admin group.

The disclosed technology, as described herein, leverages the users' enterprise IdP login credentials (e.g., a single sign-on service, or a digital fingerprint) to authenticate the users and allow them to log into any of the servers 110A-N in the enterprise data infrastructure 100. In some implementations, the disclosed technology may provide client device-based authentication for quicker authentication across servers 110A-N in the enterprise data infrastructure 100. Also, when the user logs in, their enterprise IdP login credentials can be used as a unique ID to monitor who logs in and to associate activity in the data infrastructure 100 with the particular user.

As shown in FIG. 1, the user at the client device 102 can provide, as input at the terminal 116 of the client device 102, their enterprise login, which is received by the IdP system 104 (120). In other words, the user can log into the enterprise's data infrastructure 100 via the IdP system 108 by providing their enterprise login. The enterprise login can be an enterprise IdP identity or other login credentials used at the enterprise. For example, the enterprise login can be an email address, such as "first.last@domain.com." Since the user is logging in with an enterprise account in 120, the identity of the user can be known rather than an admin group that the user is associated with. As described herein, knowing the identity of the user can be beneficial to identify suspicious or malicious behavior in the enterprise data infrastructure and link that behavior to a particular user.

Once the IdP system 104 receives the enterprise login for the particular user at the client device 102, the IdP system 104 can return a corresponding enterprise ID for the user (122). The enterprise ID can be an IdP identity associated with the user's enterprise login. The enterprise ID can also be a LanID, as described herein. The IdP system 104 can, in some implementations, return the enterprise ID coupled with a token. The token can authenticate and/or validate that the particular user has logged into the IdP system 104.

The enterprise ID and/or the token returned to the client device 102 can then be used to authenticate the user across various servers 110A-N of the enterprise data infrastructure 100. Authenticating the user via the disclosed technology may not require account translation or management, and instead provides a high level of assurance that the user logging into the IdP system 104 is who they say they are. In fact, the user's identity (e.g., their enterprise ID) can be minted into an SSH certificate to provide this higher level of assurance that the user is who they say they are and that they are authorized to access the various servers 110A-N.

For example, the ID and/or token can be used to run the transporter system 106. The transporter system 106 can run in the background when the terminal 116 is presented at the client device 102 or another window, such as a web browser interface, is launched at the client device 102. The another window can be used by the user to access one or more services provided by the servers 110A-N of the enterprise data infrastructure 100.

The client device 102 can transmit the enterprise ID (and/or the token) to the transporter system 106 (124). The transporter system 106 can be a microservice deployed within the enterprise data infrastructure 100. The transporter system 106 can also be a microservice remote from the enterprise data infrastructure 100 that is accessible via the network(s) 112. As described herein, the transporter system 106 can be used to authenticate the user of the client device 102 and essentially transport the user's identity to server access in the enterprise data infrastructure 100. The transporter system 106 can authenticate the ID with the IdP system 104 (126) to ensure that the user is who they say they are. Once the ID is authenticated, the transporter system 106 can communicate with the SSH system to generate an SSH certificate for the user using the enterprise ID (128). The user's enterprise ID can be minted into the SSH certificate to provide assurance of the user's identity. As described herein, the SSH certificate can be generated with a TTL. The SSH certificate can be used to authorize the user access to the servers 110A-N for the TTL. Once the TTL expires, a new certificate can be generated for the user's enterprise ID. The TTL can be any threshold amount of time. For example, the TTL can be 15 minutes. Once 15 minutes from SSH certificate generation expires, a new SSH certificate can be generated using the disclosed techniques. The TTL can be one or more other amounts of time, including but not limited to 5 minutes, 10 minutes, 20 minutes, 25 minutes, 30 minutes, etc. During the TTL, the user can log into any of the servers 110A-N and the servers 110A-N can authenticate the corresponding SSH certificate with the SSH system 108, as described herein.

The generated SSH certificate can also be stored on the client device 102 (130).

The SSH certificate can be transmitted from the transporter system 106 to the client device 102 (132). The SSH certificate can be added to an SSH agent or other local agent on the client device 102. The SSH agent of the client device 102 can then log into one or more of the servers 110A-N using the SSH certificate (134). In other words, the client device 102 may simply do SSH to connect to the servers 110A-N and the servers 110A-N can simply authenticate the user based on their SSH certificate with the SSH system 108. The same SSH certificate can be used across all the servers 110A-N to authenticate the user and provide the user access to the servers 110A-N in the enterprise data infrastructure 100.

The servers 110A-N, for example, can receive the SSH certificate and the user's enterprise ID. The servers 110A-N can authenticate the SSH certificate with the SSH system 108 (136) before authorizing the user access to the respective server 110A-N. As described herein, the disclosed technology leverages a singular login ID, or the enterprise ID, to grant trusted and authorized access for the user to the servers 110A-N in the enterprise data infrastructure 100. The servers 110A-N, therefore, do not have to be loaded with specific user accounts, credentials, or authorization processes-rather, the servers 110A-N can trust the SSH certificate and authentication processes with the SSH system 108 to authorize user access and also associate activity at the respective server 110A-N with the particular user.

Figure 2:
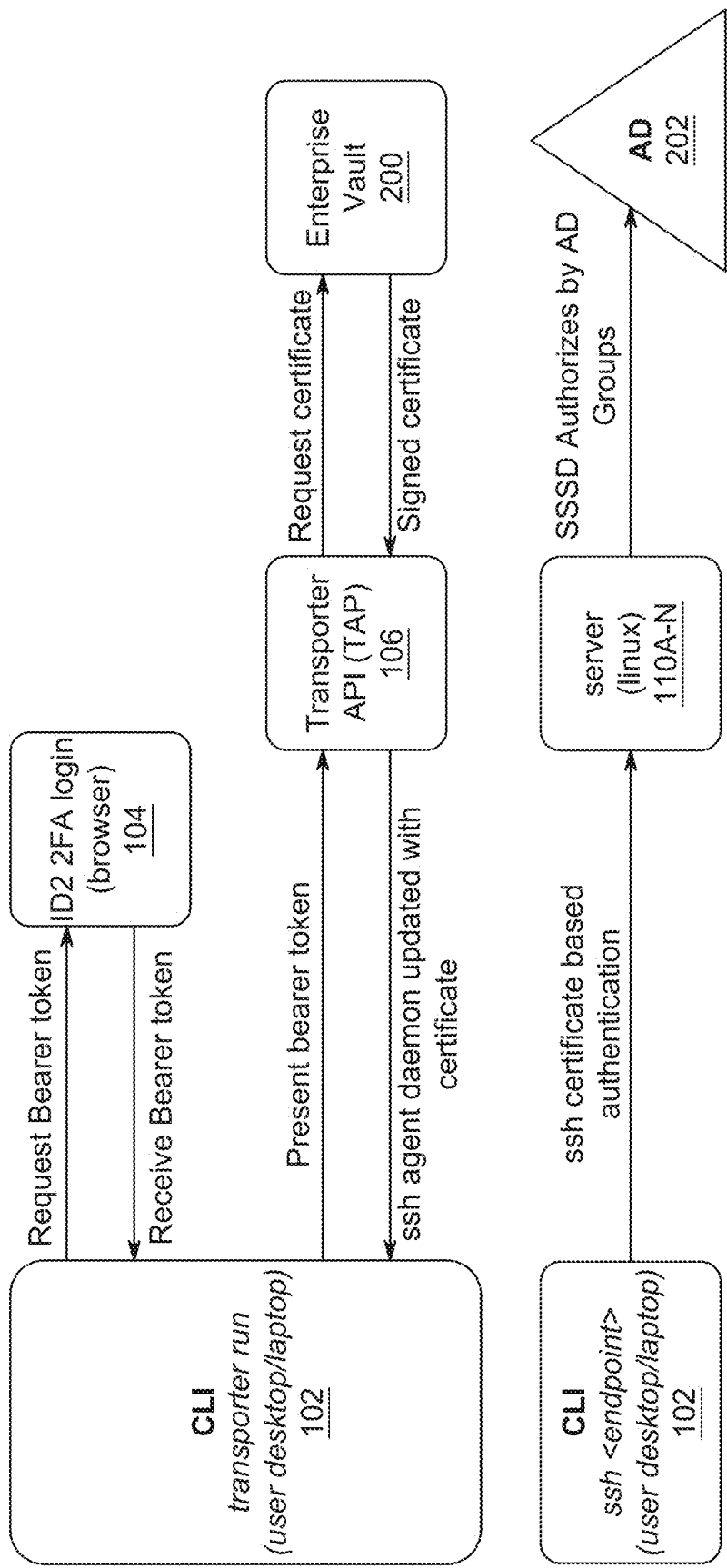
FIG. 2 is a conceptual diagram for using enterprise IdP functionality, as deployed at a client device, to grant a user access to SSH servers in an enterprise data infrastructure.

FIG. 2 is a conceptual diagram for using enterprise IdP functionality, as deployed at a client device 102, to grant a user access to SSH servers 110A-N in an enterprise data infrastructure. The client device 102 can open a terminal (e.g., refer to the terminal 116 in FIG. 1) and run a transporter tool of the transporter system 106 in the background. The client device 102 can request a bearer token from an IdP login program of the IdP system 104. In other words, the command of running the transporter tool at the client device 102 can trigger an enterprise login interface to be presented at the client device 102 in a web browser. Once the user provides their login credentials at the web browser, the client device 102 can receive the bearer token from the IdP system 104. Refer to 120-122 in FIG. 1 for further discussion.

The client device 102 can then present the bearer token to the transporter system 106 via the transporter tool running at the client device 102. The transporter system 106 can authenticate the user of the client device 102 based on the bearer token. Once successfully authenticated, the transporter system 106 can request an SSH certificate for the user's identity, via a transporter API, from an enterprise vault 200. The enterprise vault 200 can be, in some implementations, the SSH system 108 described in FIG. 1. In some implementations, the enterprise vault 200 can be a data store associated with the enterprise, such as the SSH certificates 114. The data store, for example, may already have SSH certificates associated with the user's identity and the transporter system 106 can retrieve the SSH certificate corresponding to the user's identity. The transporter system 106 can receive the signed SSH certificate from the enterprise vault 200 and add the certificate to an SSH agent daemon (or other local agent) at the client device 102. Refer to 124-132 in FIG. 1 for further discussion. The client device 102 can then provide the signed SSH certificate to servers 110A-N of the enterprise data infrastructure for SSH certificate-based authentication.

The disclosed technology provides the transporter system 106 that combines a client-based tool to request/renew SSH certificates with a transporter API that issues certificates that are valid for 15 minutes (TTL). This SSH certificate can be used for key-based SSH authentication on any of the servers 110A-N that have been configured to use the techniques of the transporter system 106. The servers 110A-N can manage authorization via SSSD by AD groups 202. Non-SSSD configurations can also be used in some enterprise data infrastructures. The disclosed technology can be executed once SSH access is established to the endpoint servers 110A-N and access is established to the servers 110A-N via SSSD. In some implementations, the transporter system 106 can be used to access Linux-based servers in non-secure segments of the enterprise data infrastructure. The transport system 106 can also be used with PCI scope systems (e.g., parts of a network environment that meet requirements of payment card industry (PCI) data security standards (DSS) regarding, for example, a combination of people, processes, and technologies that interact with or could impact security of cardholder data (CHD)) and/or SOX systems (e.g., network environments having formal data security policies, communication of such policies, and consistent enforcement of such policies that allows for privacy for secure transfer of financial information directly to accountable parties).

Figure 3A:
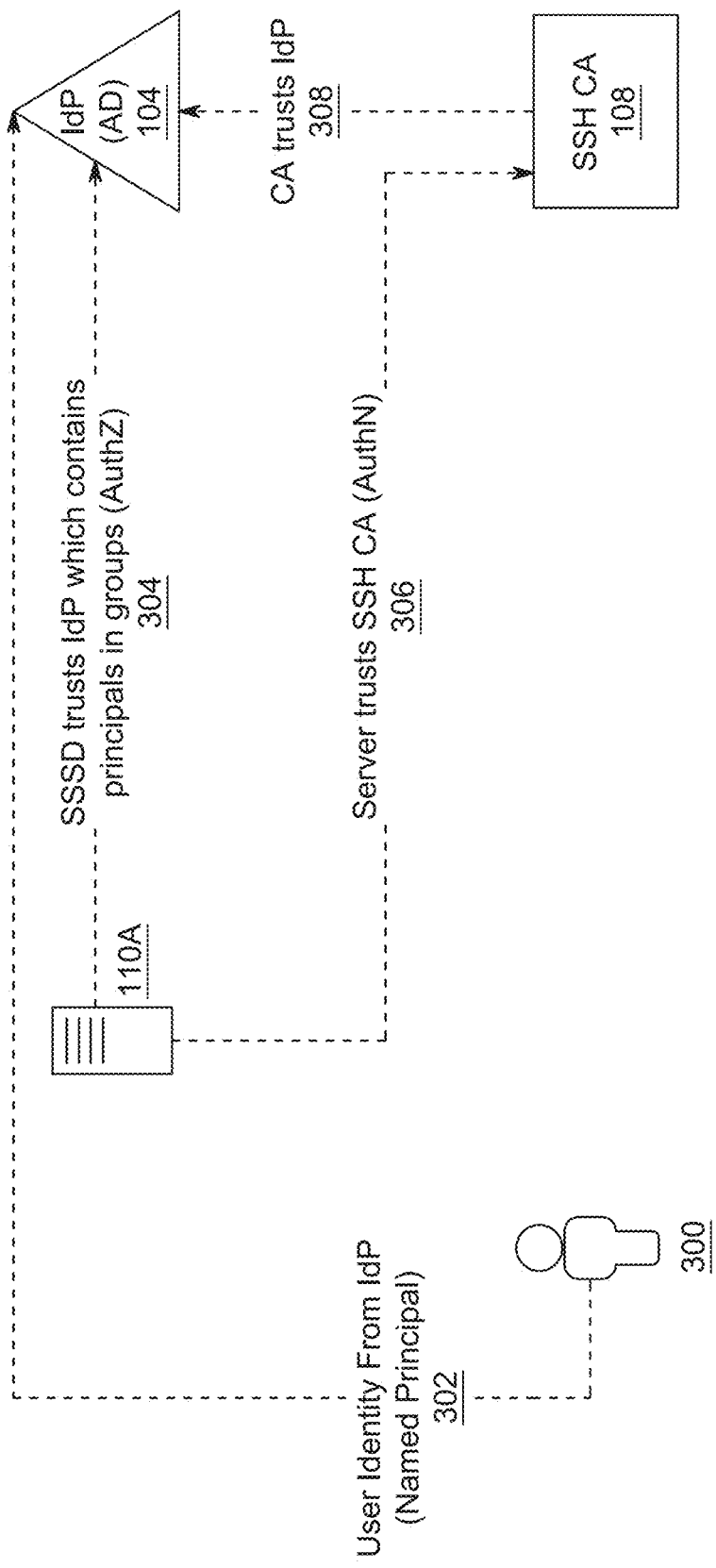
FIG. 3A is a conceptual diagram for establishing trust between a server in an enterprise data infrastructure and a certificate authority service.

FIG. 3A is a conceptual diagram for establishing trust between a server 110A in an enterprise data infrastructure and a certificate authority service 108. As described herein, an SSH certificate can be used to establish trust and authenticate a user 300 based on their enterprise IdP identity. The user 300 can log in to the IdP system 104 with their enterprise login (302). The enterprise login can include an enterprise account for the user 300. The enterprise account can identify the user (e.g., named principal) and be used by the IdP system 104 to authenticate and associate the user with one or more active directory (AD) groups.

The certificate authority service 108, such as a SSH certificate authority (CA) trusts the IdP system 104 (308) so that the certificate authority service 108 can generate an SSH certificate for the user 300 that mints the identity of the user 300 (e.g., named principal) to the certificate.

The server 110A trusts the certificate authority service 108 (306) and therefore can authenticate the user 300 when the user logs into the server 110A with the SSH certificate that was generated by the certificate authority service 108. Moreover, the server 110A trusts the IdP via SSSD (304), which provides for cross-authentication to authorize the user's access to the server 110A.

Figure 3B:
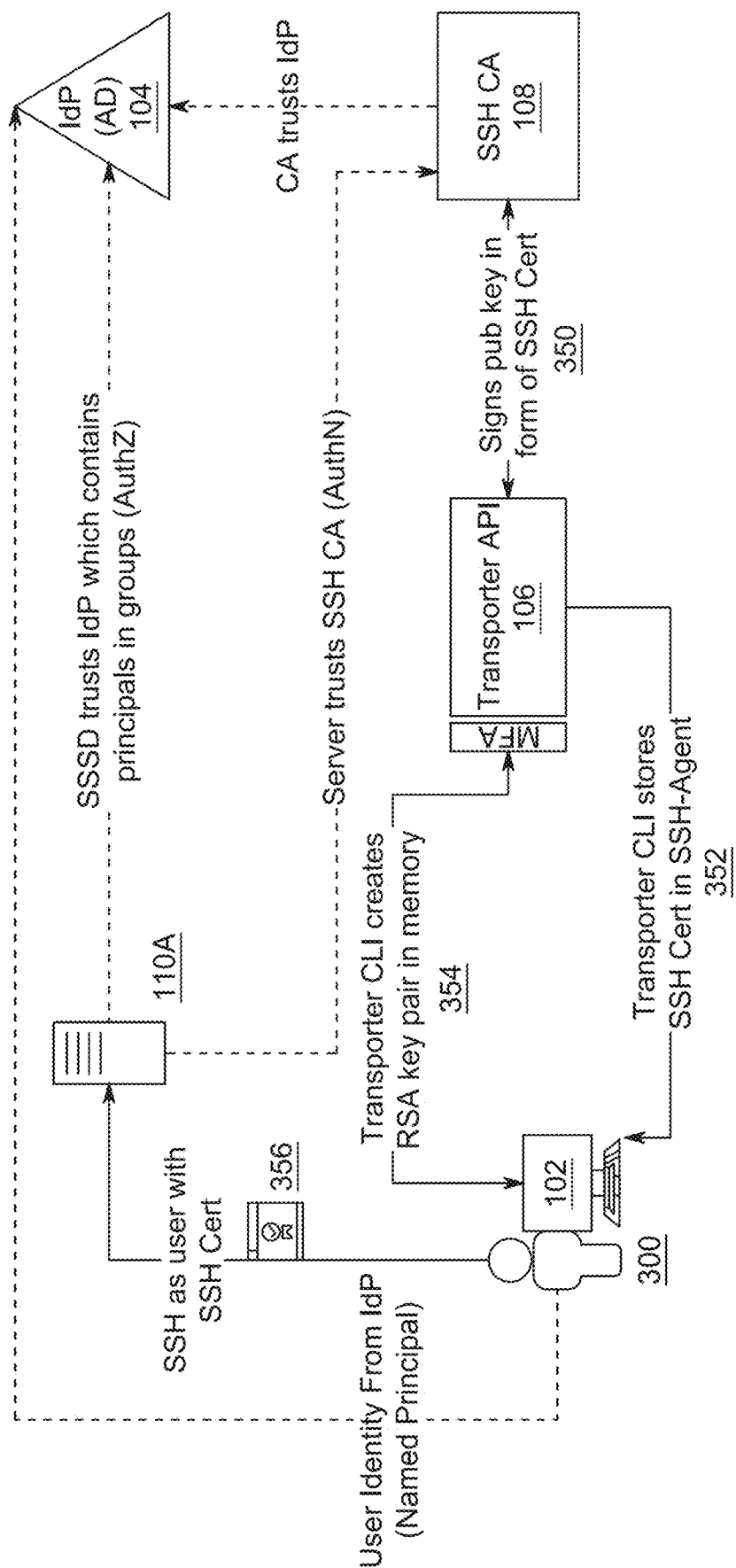
FIG. 3B is a conceptual diagram for authenticating user access to the server in the enterprise data infrastructure of FIG. 3A using the user's enterprise IdP identity.

FIG. 3B is a conceptual diagram for authenticating user access to the server 110A in the enterprise data infrastructure of FIG. 3A using the user's enterprise IdP identity and the transporter system 106. As described in reference to FIGS. 1-2, the transporter system 106 can be used to authenticate the user 300, generate a trusted SSH certificate for the user 300 based on their enterprise login, and then use that SSH certificate to authenticate the user at the server 110A and other servers within the enterprise data infrastructure. The transporter system 106 can leverage the trust that was established between the server 110A, the IdP system 104, and the certificate authority service 108 as described in FIG. 3A.

As shown in FIG. 3B, the transporter system 106 can provide a public key to the certificate authority service 108 (350). The transporter system 106 can receive back a signed key from the certificate authority service 108 that serves as an SSH certificate, as described throughout this disclosure (350). The transporter system 106 can transmit the SSH certificate to the client device 102 of the user 300 (354). The transporter system 106 can create, for example, an RSA key pair in memory at the client device (354). The SSH certificate can reside in memory at the client device 102 (352). For example, the SSH certificate can be stored in an SSH agent or other local agent at the client device 102. The client device 102 can then perform SSH with the server 110A using the SSH certificate that resides in memory at the client device 102 (356).

Figure 4A:
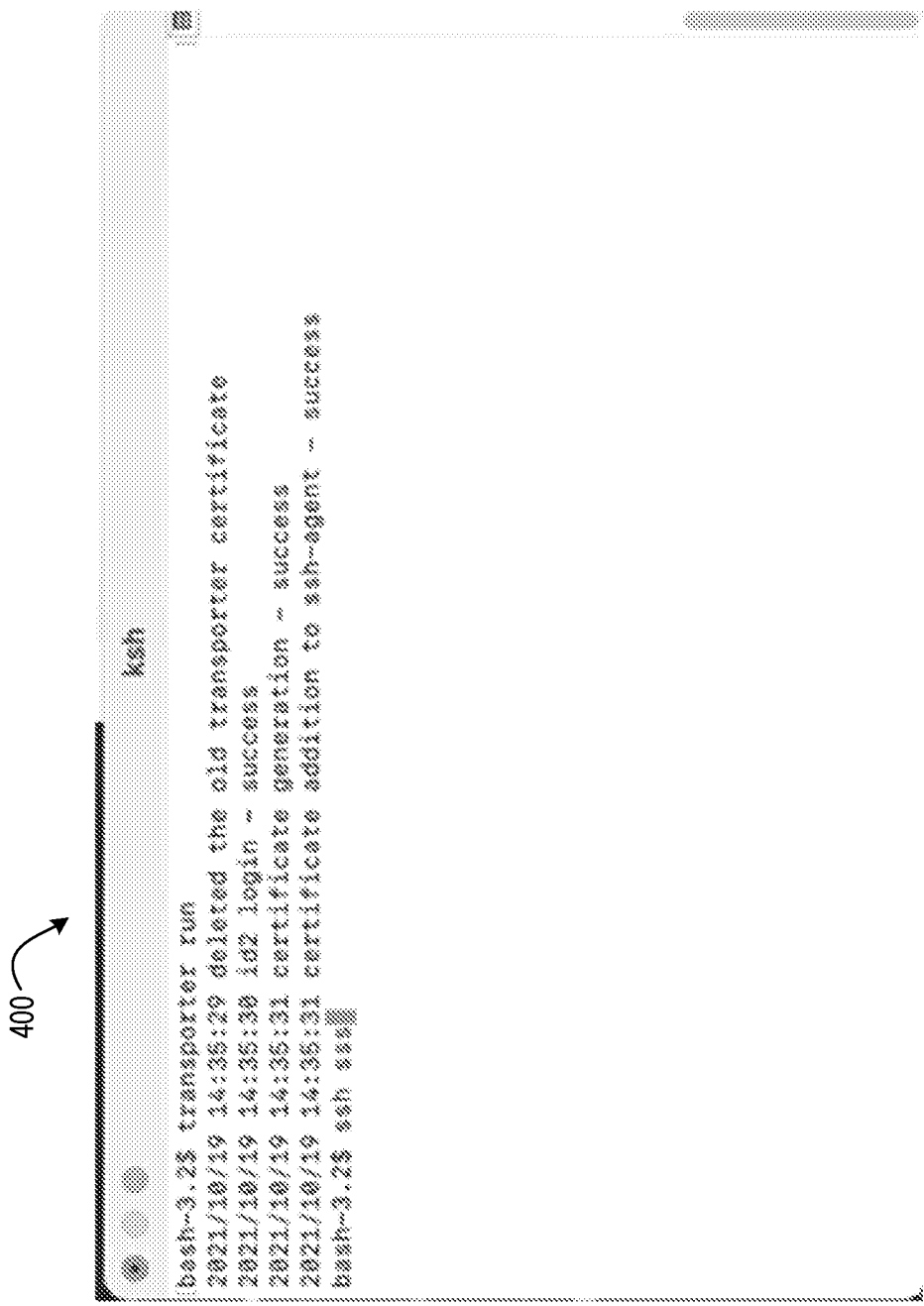
FIG. 4A is an example executable presented at a terminal of a client device for interfacing with an identity provider.

FIG. 4A is an example executable 400 presented at a terminal of a client device for interfacing with an identity provider. The executable 400 can be presented in the terminal 116 at the client device 102 as described in FIG. 1. The identity provider can be, for example, the IdP system 104. The executable 400 can be command line. The executable 400 can allow interfacing with the identity provider via Fast Identity Online (FIDO) protocols, which can use public key cryptography techniques to provide stronger authentication while protecting user privacy. FIDO can be used for online user identity authentication. FIDO can, for example, be used in scenarios such as fingerprint logins, fingerprint authentication, and/or two factor logins or two step authentications. The executable 400 can, in some implementations, trigger fingerprint authentication. Moreover, the executable 400 can be used to add an SSH certificate to an SSH agent or other local agent at the client device once the user has been authenticated and the SSH certificate has been generated and minted with the user's enterprise login.

Figure 4B:
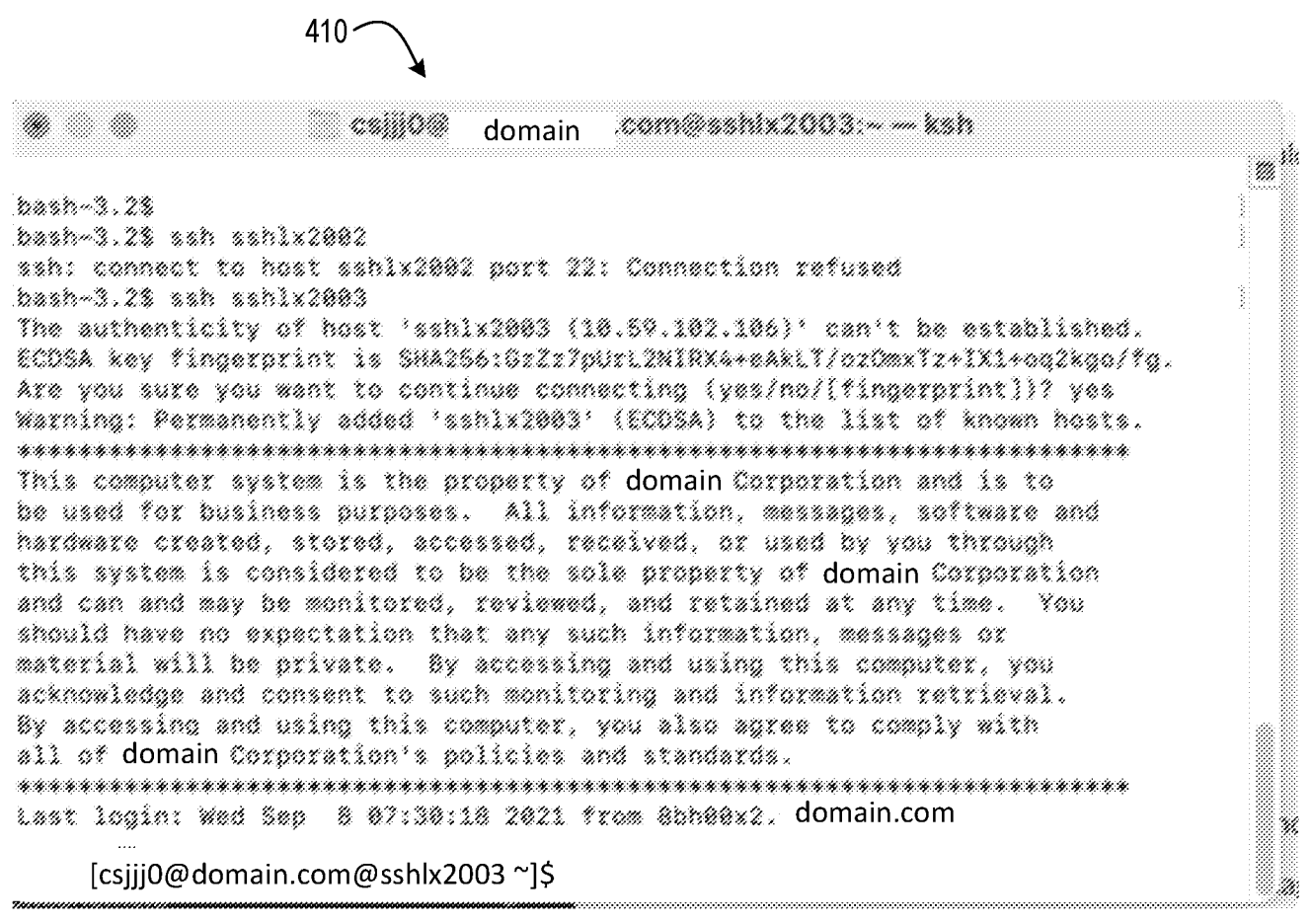

FIG. 4B is an example output 410 from running the executable 400 in FIG. 4A indicating that a user has logged into a server of an enterprise data infrastructure using their respective enterprise IdP identity. As described herein, the enterprise IdP identity can be an enterprise login, such as a username or "first.last@domain.com" identifier associated with the user. In the example of FIG. 4B, the user's enterprise IdP identity is "csjjj0@domain.com." Once the user logs into the IdP system of the network data infrastructure with this identity, the user's activity in the network data infrastructure can be linked back to this identity. Therefore, the disclosed technology can provide for tracking malicious activity in the infrastructure and associating the malicious activity with a particular user (or users) in the infrastructure to be able to respond to and/or prevent the malicious activity.

The output 410 indicates that the user having the enterprise IdP identity of "csjjj0@domain.com" is successfully logged into a server of the enterprise data infrastructure that is identified as "sshlx2003." This indication is shown with a value of username@domain@server name." One or more other formats or naming conventions can be used and presented in the output 410 to indicate which user is authenticated and signed into which server in the enterprise's data infrastructure.

The user is also positively identified on the server "sshlx2003" by their identity "csjjj0@domain.com." As described herein, the enterprise IdP can be any other username or identifier used by the user to log into the IdP system of the network data infrastructure. For example, the username can be in the format of "firstname.lastname." The username can also be in the format of any one or more combinations of the user's first name, middle name, last name, and/or initials. Since the user is positively identified on the server by their enterprise IdP identity (e.g., username), their password is not required to authenticate the user at the particular server or other servers in the enterprise's data infrastructure.

Figure 4C:
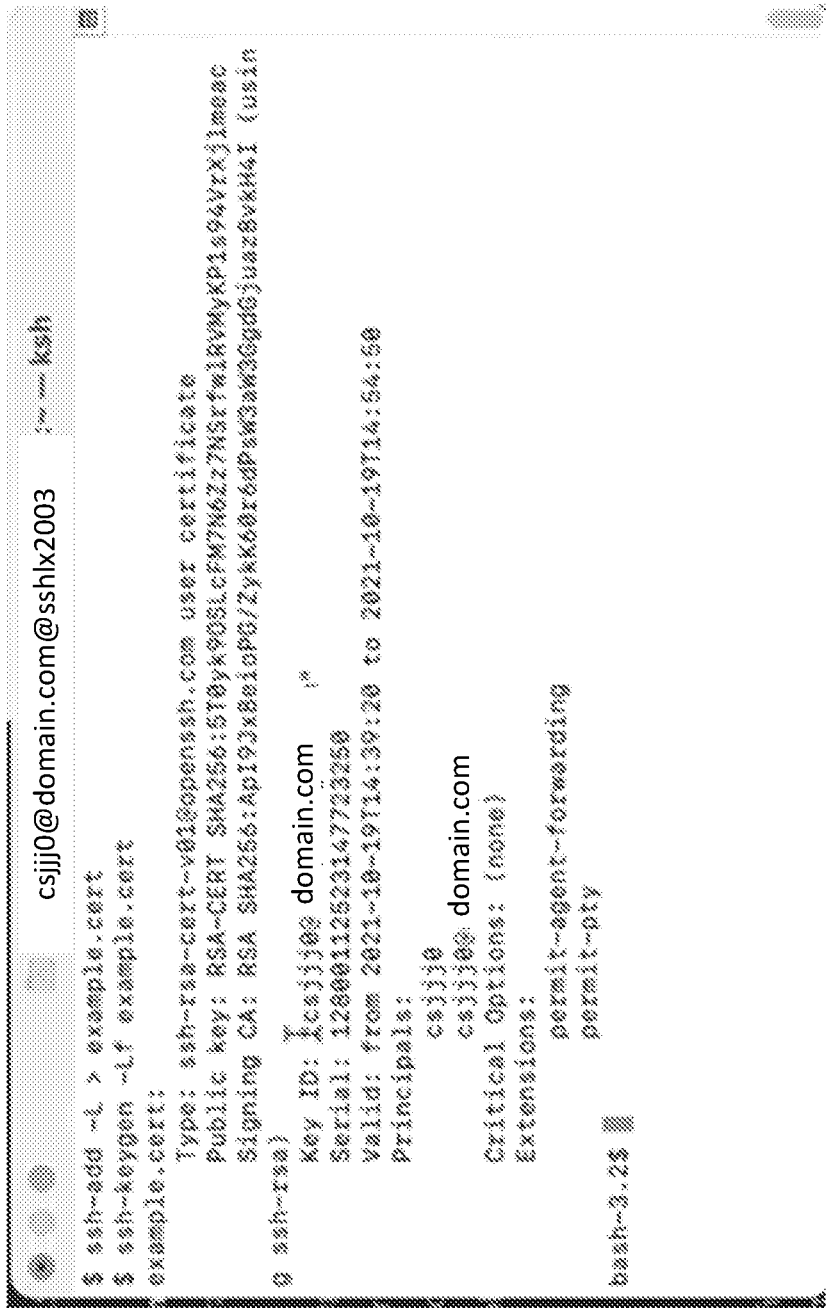
FIG. 4C is an example certificate indicating that the user in FIG. 4B is trusted and authenticated to access the server in the enterprise data infrastructure.

FIG. 4C is an example certificate 420 indicating that the user "csjjj0@domain.com" in FIG. 4B is trusted and authenticated to access the server "sshlx2003" in the enterprise data infrastructure. The certificate 420 can be structured in such a way that allows for single sign-on of the user in the enterprise data infrastructure.

The certificate 420 can include one or more data values shown in FIG. 4C. For example, the certificate 420 can indicate a type of certificate that has been generated for the particular user. Here, an SSH RSA certificate is generated. The certificate 420 can also include an indication of a public key associated with the certificate. The certificate 420 can also include a signing value associated with the certificate. The certificate 420 can include a key ID, which corresponds to the user's enterprise IdP identity (e.g., "cjjj0@domain.com"). The certificate 420 can include a serial associated with the certificate 420. The certificate 420 can also include a valid value, which can indicate when the certificate was generated. The valid value can also indicate an amount of time that the currently generated certificate 420 is valid, or a TTL. As described herein, the TTL can be 15 minutes. The TTL can be one or more other periods of time described herein.

The certificate 420 can include a principals value, which can be used to identify the user. Multiple values can be assigned to the principals for the particular user. For example, the user's enterprise IdP identity can be listed as a principal value for identifying the user in the enterprise data infrastructure. Any other user names and/or combinations of the user's name and/or initials can also be defined and listed as a principal value in the certificate 420. Therefore, the user can be identified across servers in the enterprise data infrastructure using any of the listed principal values. Moreover, the certificate 420 can include extensions, which can indicate AD group memberships of the user and/or other accesses or permissions that the user has in the enterprise data infrastructure.

Figure 5:
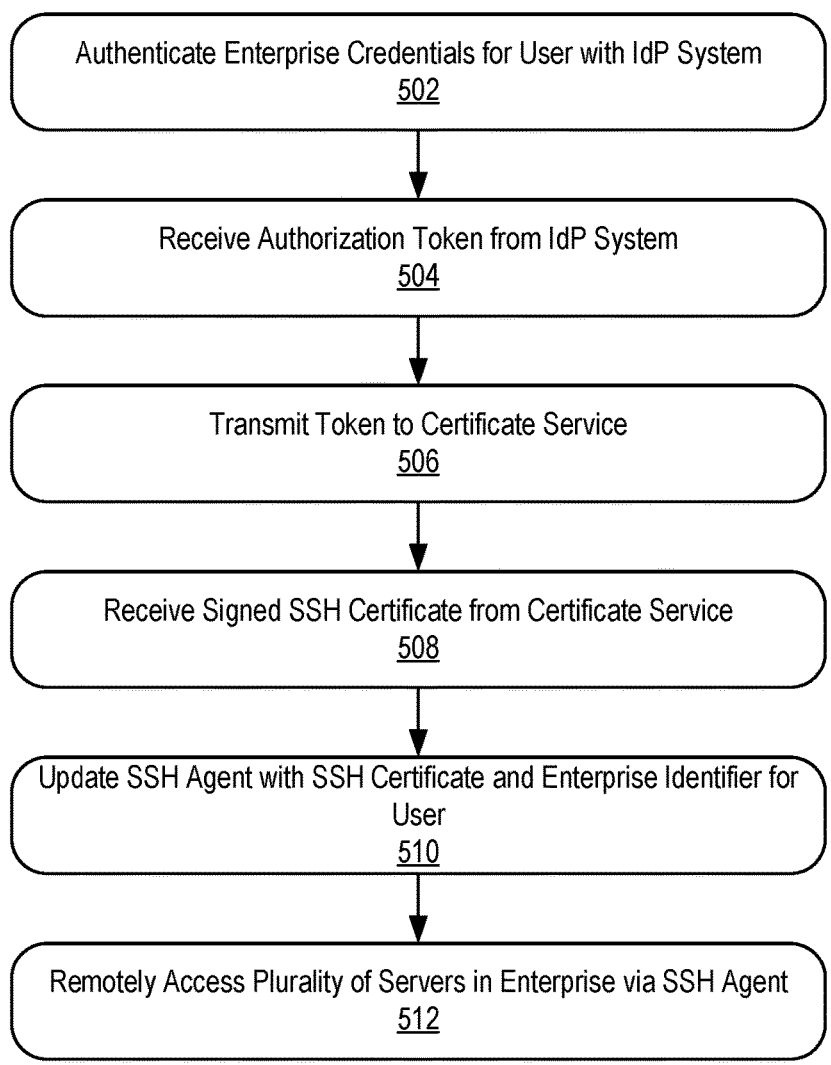
FIG. 5 is an example process for remotely accessing a plurality of servers within an enterprise network via an SSH certificate.

FIG. 5 is an example process 500 for remotely accessing a plurality of servers within an enterprise network via an SSH certificate. The example process 500 can be performed by any of a variety of appropriate computing devices and/or systems, such as the client device 102 described above with regard to FIG. 1. The process 500 can also be performed by one or more other computing systems, devices, computers, networks, cloud-based systems, and/or cloud-based services. For illustrative purposes, the process 500 is described from the perspective of a client device, and additional processes can be performed by other computing devices and/or systems with which the client device interacts and communicates as part of the process 500.

Enterprise credentials for a user at a client computing device can be authenticated with an IdP system (502). For example, a user of the client computing device 102 can launch an application, such as a web browser directed to a URL for an SSO service on the enterprise, which can prompt the user to login using enterprise credentials, such as username, password, two-factor authentication information, biometric information, and/or other details. Once authenticated with the IdP system, the client computing device can receive an authentication token from the IdP system (504). For example, the client device 102 can receive a bearer token that authenticates client device and the associated enterprise identifier, such as a LanID for the user, within the enterprise network.

The client device can transmit the token to a certificate service (506). For example, the client device 102 can transmit the bearer token from the IdP service to a certificate service, such as the Transporter System 106, which can use the bearer token to generate a private-public key pair (e.g., RSA public-private key pair). The Transporter System 106 can transmit the public key to the SSH system 108, which can sign the public key to generate an SSH certificate based on the bearer token. The Transporter System 106 can designate a TTL for the SSH certificate, which can be a shorter period of time (e.g., 5 minutes, 10 minutes, 15 minutes, 25 minutes, 40 minutes), after which time the SSH certificate can expire. The Transporter System 106 can maintain the private key locally for the duration of the TTL and can use the private key to validate any challenges to the authenticity of the SSH certificate and the corresponding user authorizations provided by the IdP system 104.

The client device can receive the signed SSH certificate from the certificate service (508) and can update the local SSH agent on the client computing device to use the SSH certificate and enterprise identifier for the user (510). For example, the client device 102 can update its local SSH agent to use the SSH certificate in combination with the enterprise identifier for the user. The client device can then remotely access any of a plurality of servers in the enterprise environment using the SSH agent (512). For example, the client device 102 can use its SSH agent updated with the SSH certificate to access any of the servers 110a-n, which can authenticate the SSH certificate and/or authorizations associated with the enterprise user, such as through the use of SSSD and AD group memberships. Upon expiration of the SSH certificate (e.g., expiration of the TTL for the SSH certificate), the process 500 can be repeated for the user and the client device 102 to remotely access the servers 110a-n.

Figure 6:
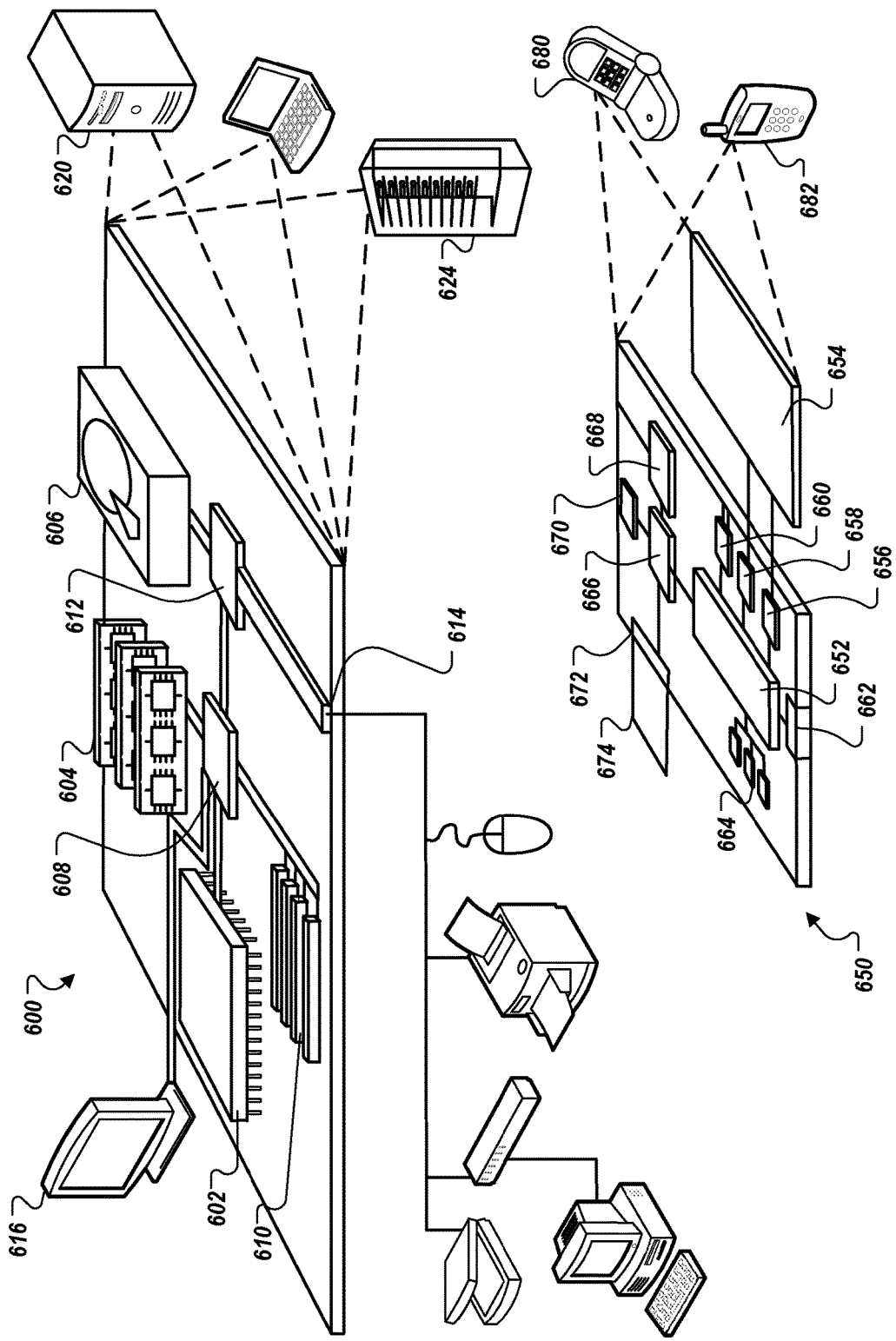
FIG. 6 is a schematic diagram that shows an example of a computing device and a mobile computing device.

FIG. 6 shows an example of a computing device 600 and an example of a mobile computing device that can be used to implement the techniques described here. The computing device 600 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and can be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 can also be another form of computer-readable medium, such as a magnetic or optical disk.

The storage device 606 is capable of providing mass storage for the computing device 600. In some implementations, the storage device 606 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 604, the storage device 606, or memory on the processor 602.

The high-speed interface 608 manages bandwidth-intensive operations for the computing device 600, while the low-speed interface 612 manages lower bandwidth-intensive operations. Such allocation of functions is exemplary only. In some implementations, the high-speed interface 608 is coupled to the memory 604, the display 616 (e.g., through a graphics processor or accelerator), and to the high-speed expansion ports 610, which can accept various expansion cards (not shown). In the implementation, the low-speed interface 612 is coupled to the storage device 606 and the low-speed expansion port 614. The low-speed expansion port 614, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 600 can be implemented in a number of different forms, as shown in the figure. For example, it can be implemented as a standard server 620, or multiple times in a group of such servers. In addition, it can be implemented in a personal computer such as a laptop computer 622. It can also be implemented as part of a rack server system 624. Alternatively, components from the computing device 600 can be combined with other components in a mobile device (not shown), such as a mobile computing device 650. Each of such devices can contain one or more of the computing device 600 and the mobile computing device 650, and an entire system can be made up of multiple computing devices communicating with each other.

The mobile computing device 650 includes a processor 652, a memory 664, an input/output device such as a display 654, a communication interface 666, and a transceiver 668, among other components. The mobile computing device 650 can also be provided with a storage device, such as a micro-drive or other device, to provide additional storage. Each of the processor 652, the memory 664, the display 654, the communication interface 666, and the transceiver 668, are interconnected using various buses, and several of the components can be mounted on a common motherboard or in other manners as appropriate.

The processor 652 can execute instructions within the mobile computing device 650, including instructions stored in the memory 664. The processor 652 can be implemented as a chipset of chips that include separate and multiple analog and digital processors. The processor 652 can provide, for example, for coordination of the other components of the mobile computing device 650, such as control of user interfaces, applications run by the mobile computing device 650, and wireless communication by the mobile computing device 650.

The processor 652 can communicate with a user through a control interface 658 and a display interface 656 coupled to the display 654. The display 654 can be, for example, a TFT (Thin-Film-Transistor Liquid Crystal Display) display or an OLED (Organic Light Emitting Diode) display, or other appropriate display technology. The display interface 656 can comprise appropriate circuitry for driving the display 654 to present graphical and other information to a user. The control interface 658 can receive commands from a user and convert them for submission to the processor 652. In addition, an external interface 662 can provide communication with the processor 652, so as to enable near area communication of the mobile computing device 650 with other devices. The external interface 662 can provide, for example, for wired communication in some implementations, or for wireless communication in other implementations, and multiple interfaces can also be used.

The memory 664 stores information within the mobile computing device 650. The memory 664 can be implemented as one or more of a computer-readable medium or media, a volatile memory unit or units, or a non-volatile memory unit or units. An expansion memory 674 can also be provided and connected to the mobile computing device 650 through an expansion interface 672, which can include, for example, a SIMM (Single In Line Memory Module) card interface. The expansion memory 674 can provide extra storage space for the mobile computing device 650, or can also store applications or other information for the mobile computing device 650. Specifically, the expansion memory 674 can include instructions to carry out or supplement the processes described above, and can include secure information also. Thus, for example, the expansion memory 674 can be provide as a security module for the mobile computing device 650, and can be programmed with instructions that permit secure use of the mobile computing device 650. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 664, the expansion memory 674, or memory on the processor 652. In some implementations, the computer program product can be received in a propagated signal, for example, over the transceiver 668 or the external interface 662.

The mobile computing device 650 can communicate wirelessly through the communication interface 666, which can include digital signal processing circuitry where necessary. The communication interface 666 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 668 using a radio-frequency. In addition, short-range communication can occur, such as using a Bluetooth, WiFi, or other such transceiver (not shown). In addition, a GPS (Global Positioning System) receiver module 670 can provide additional navigation- and location-related wireless data to the mobile computing device 650, which can be used as appropriate by applications running on the mobile computing device 650.

The mobile computing device 650 can also communicate audibly using an audio codec 660, which can receive spoken information from a user and convert it to usable digital information. The audio codec 660 can likewise generate audible sound for a user, such as through a speaker, e.g., in a handset of the mobile computing device 650. Such sound can include sound from voice telephone calls, can include recorded sound (e.g., voice messages, music files, etc.) and can also include sound generated by applications operating on the mobile computing device 650.

The mobile computing device 650 can be implemented in a number of different forms, as shown in the figure. For example, it can be implemented as a cellular telephone 680. It can also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method for authenticating and logging server access using enterprise credentials for security threat mitigation, the method comprising:
    launching command-line program at a client computing device operating within an enterprise environment for interfacing with an enterprise identity provider ("IdP") system using Fast Identity Online Protocols (FIDO);
    authenticating, by the command-line program at the client computing device, a user with the IdP system that is configured to authenticate based on user enterprise credentials transmitted by the client computing device to the enterprise IdP system, wherein the user enterprise credentials include an enterprise identifier for the user;
    receiving, at the client computing device and in response to the user being authenticated, a bearer token from the enterprise IdP system, wherein the bearer token authenticates the enterprise credentials for the user within the enterprise environment;
    transmitting, by the command-line program at the client computing device, the bearer token to a certificate service, wherein the certificate service is configured to use the bearer token to obtain a secure shell ("SSH") certificate signed by an SSH certificate authority ("CA") within the enterprise environment;
    receiving, at the client computing device, the SSH certificate signed by the SSH CA based on the bearer token;
    updating, by the command-line program at the client computing device, an SSH agent on the client computing device to use the SSH certificate with the enterprise identifier for the user; and
    remotely accessing, by the SSH agent of the client computing device, any of a plurality of servers within the enterprise environment using the SSH certificate and enterprise identifier for the user, wherein each server of the plurality of servers is configured to:
        authenticate the remote access by the client computing device based, at least in part, on the SSH certificate signed by the SSH CA,
        log activities of the client computing device based on the authenticating, and
        return the logged activities for (i) identifying whether the client computing device, while remotely accessing the server, engages in risky behavior that poses a security threat to the enterprise environment and (ii) preventing the security threat based on the identifying.

2. The method of claim 1, wherein each of the plurality of servers is configured to use one or more system security services daemons ("SSSD") services to authorize a principal in the SSH certificate, the principal being a string that permits access to each of the plurality of servers.

3. The method of claim 2, wherein the one or more SSSD services are configured to authorize the principal in the SSH certificate based, at least in part, on Active Directory ("AD") group membership of the enterprise identifier.

4. The method of claim 3, wherein the AD group membership of the enterprise identifier indicates whether and to what extent the corresponding user is entitled to access the plurality of servers within the enterprise environment.

5. The method of claim 1, wherein the certificate service is configured to generate and store a public-private key pair based on the bearer token for the user, to provide the public key to the SSH CA for signing, and to provide the signed public key to the client computing device as the SSH certificate.

6. The method of claim 5, wherein the certificate service is further configured to designate a time-to-live ("TTL") for the SSH certificate, wherein the TTL comprises a time period during which the SSH certificate is valid to authenticate the remote access to the plurality of servers by the user.

7. The method of claim 6, wherein attempts to remotely access the plurality of servers using the SSH certificate after expiration of the TTL time period are declined.

8. The method of claim 6, wherein the TTL time period comprises a short time period less than or equal to a threshold period of time.

9. The method of claim 8, wherein the threshold period of time comprises 15 minutes.

10. The method of claim 1, wherein the remote access by the client computing device uniquely identifies the user on the plurality of servers with the enterprise identifier.

11. The method of claim 10, wherein the plurality of servers are configured to log the remote access by the user using the enterprise identifier for the user.

12. The method of claim 1, wherein the remote access by the client computing device is accomplished without local authentication of the user by the plurality of servers.

13. The method of claim 1, wherein the remote access by the client computing device is accomplished without locally authenticating credentials for the user by the plurality of servers.

14. The method of claim 1, wherein the enterprise identifier comprises a personal LanID for the user within the enterprise environment.

15. A system for authenticating and logging server access using enterprise credentials for security threat mitigation, the system comprising:
    an enterprise environment having a plurality of servers;
    a client computing device operating within the enterprise environment; and
    an enterprise identity provider ("IdP") system that is configured to authenticate users based on user enterprise credentials transmitted by the client computing device to the enterprise IdP system, wherein the user enterprise credentials include at least an enterprise identifier for the user,
    wherein the client computing device is configured to:
        launch a command-line program for interfacing with the IdP system using FIDO;
        authenticate, using the command-line program, a user with the enterprise IdP system;
        receive, in response to the user being authenticated, a bearer token from the enterprise IdP system, wherein the bearer token authenticates the enterprise credentials for the user within the enterprise environment;

transmit, using the command-line program, the bearer token to a certificate service, wherein the certificate service is configured to use the bearer token to obtain a secure shell ("SSH") certificate signed by an SSH certificate authority ("CA") within the enterprise environment;

receive the SSH certificate signed by the SSH CA based on the bearer token;

update, using the command-line program, an SSH agent on the client computing device to use the SSH certificate with the enterprise identifier for the user; and remotely access, by the SSH agent, any of the plurality of servers within the enterprise environment using the SSH certificate and enterprise identifier for the user, wherein each server of the plurality of servers is configured to;

authenticate the remote access by the client computing device based, at least in part, on the SSH certificate signed by the SSH CA, log activities of the client computing device based on the authenticating, and return the logged activities for (i) identifying whether the client computing device, while remotely accessing the server, engages in risky behavior that poses a security threat to the enterprise environment and (ii) preventing the security threat based on the identifying.

16. The system of claim 15, wherein each of the plurality of servers is configured to use one or more system security services daemons ("SSSD") services to authorize a principal in the SSH certificate, the principal being a string that permits access to each of the plurality of servers.

17. The system of claim 15, wherein the certificate service is configured to generate and store a public-private key pair based on the bearer token for the user, to provide the public key to the SSH CA for signing, and to provide the signed public key to the client computing device as the SSH certificate.

18. The system of claim 17, wherein the certificate service is further configured to designate a time-to-live ("TTL") for the SSH certificate, wherein the TTL comprises a time period during which the SSH certificate is valid to authenticate the remote access to the plurality of servers by the user.

19. The system of claim 15, wherein the remote access by client computing device uniquely identifies the user on the plurality of servers with the enterprise identifier, the plurality of servers being configured to log the remote access by the user using the enterprise identifier for the user.

20. The system of claim 15, wherein the remote access by the client computing device is accomplished without local authentication of the user by the plurality of servers.

\* \* \* \* \*